Jan. 13, 1970    P. J. LUNDE ET AL    3,488,974

WATER PURIFYING APPARATUS

Filed Jan. 4, 1965    5 Sheets-Sheet 1

INVENTORS.
PETER J. LUNDE.
CHARLES A. JOHNSON.
BY Raymond Curtin
ATTORNEY.

INVENTORS.
PETER J. LUNDE.
CHARLES A. JOHNSON.
BY
Raymond Curtin
ATTORNEY.

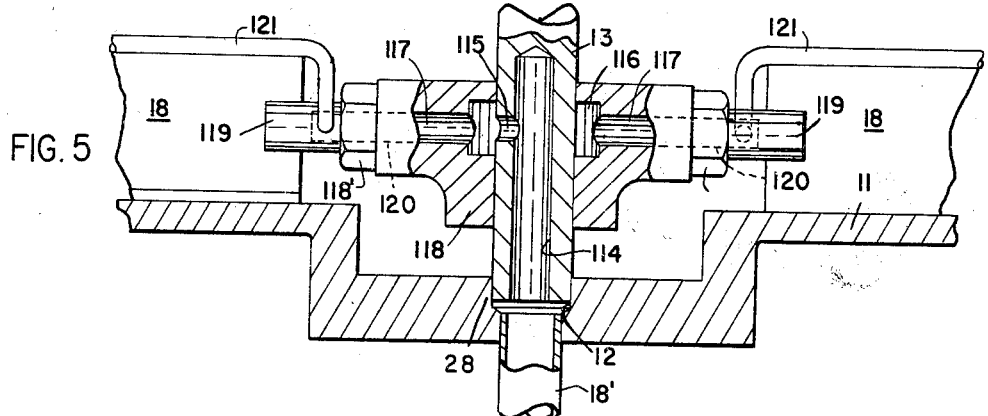
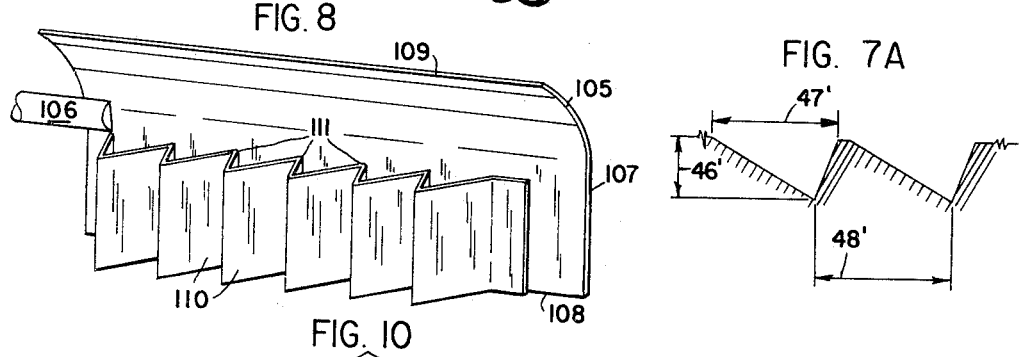
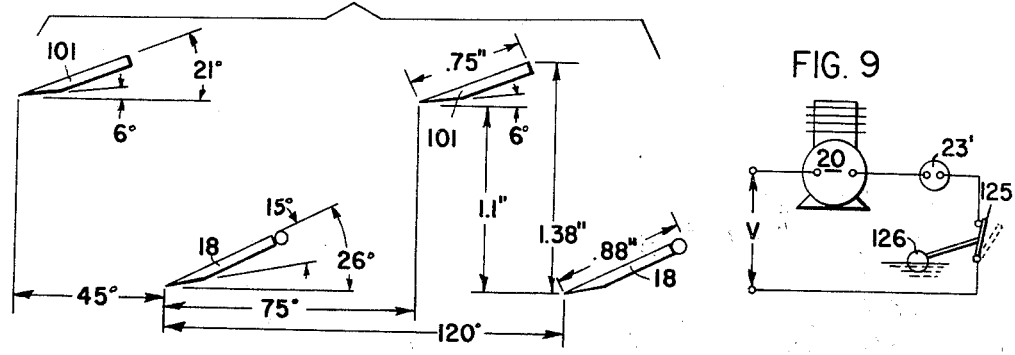
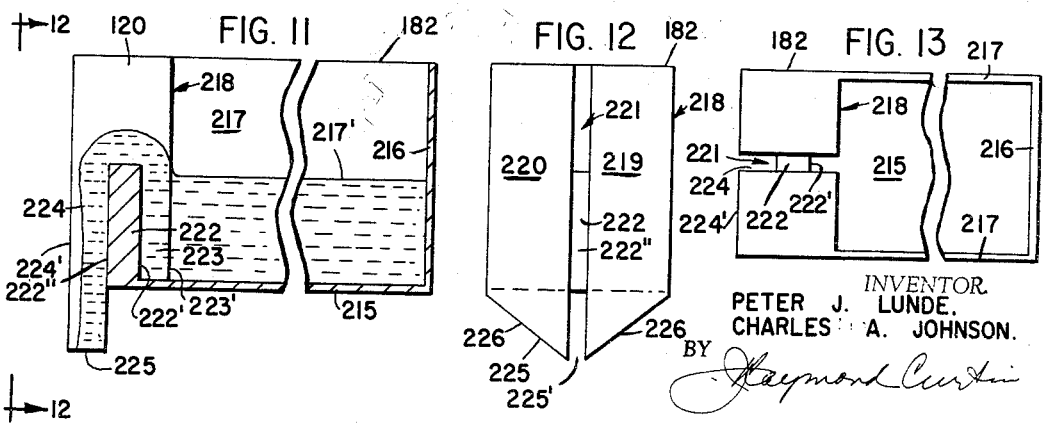

INVENTORS.
PETER J. LUNDE.
CHARLES A. JOHNSON.
BY J. Raymond Curtin
ATTORNEY.

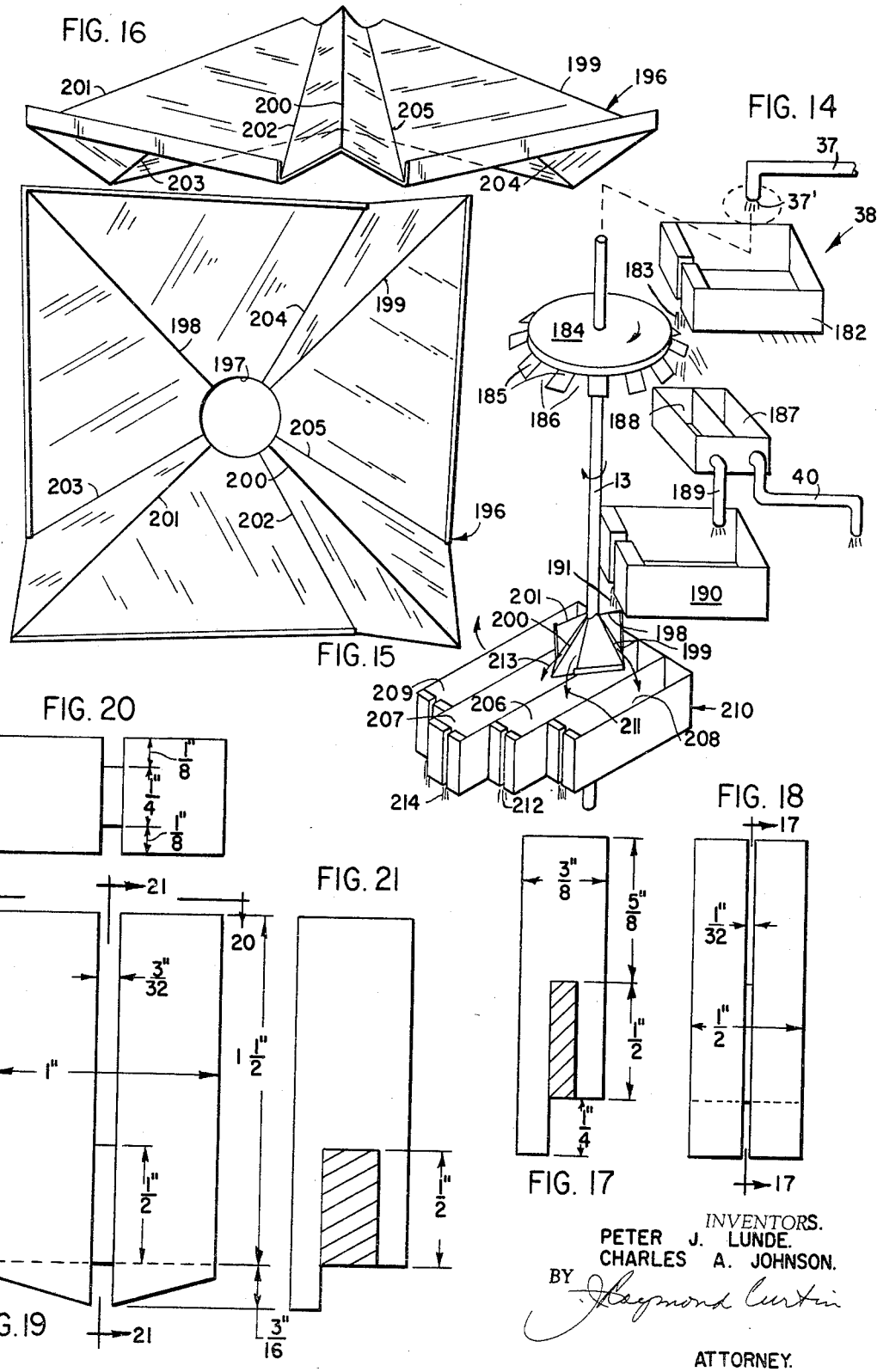

United States Patent Office 3,488,974
Patented Jan. 13, 1970

3,488,974
WATER PURIFYING APPARATUS
Peter J. Lunde and Charles A. Johnson, Cazenovia, N.Y., assignors to Carrier Corporation, Syracuse, N.Y., a corporation of Delaware
Filed Jan. 4, 1965, Ser. No. 423,213
Int. Cl. C02b 1/12; F25c 1/14
U.S. Cl. 62—123                                11 Claims

ABSTRACT OF THE DISCLOSURE

A water purifying apparatus comprises a cylindrical container with a bottom freezing surface. A vertical shaft has a scraper adjacent the bottom surface and separate means extending radially from the shaft overlying the scraper and spaced therefrom.

---

The present invention relates to an improved apparatus for and method of converting impure water into purified water, in small quantities, by the use of a freezing process.

The term "purified water" as used herein means water from which all or a substantial proportion of impurities have been removed by flow through the apparatus or method forming the subject of the invention.

Various types of apparatus have been known in the past for producing purified water from impure water by a selective freezing process wherein a portion of the impure water was frozen into ice and said ice was separated from the remainder of the impure water, washed, and thereafter melted to form purified water. It is with an improved device of this general type for producing purified water in small quantities with which the present invention is concerned.

It is one object of the present invention to produce an improved water purifying apparatus which converts impure water into purified water on a small scale by a selective freezing process in a simple, automatic, and extremely expedient manner. A related object of the present invention is to provide apparatus of the foregoing type which is highly efficient and which utilizes a relatively small number of relatively simple parts. Other objects and attendant advantages of the present invention will readily be perceived hereafter.

One embodiment of the present invention comprises a vertically oriented container having a cooled bottom plate on which ice is formed from a portion of the impure water which is fed into the container. A scraper removes ice so formed from the bottom plate and this ice is moved upwardly through the container. Drain apertures are provided in the container near the bottom thereof for permitting the draining of the impure water remaining after ice has been frozen from the input water. The ice after reaching a predetermined level in the container is removed gradually from the top thereof and melted to form purified water, and a portion of this purified water is saved as a potable product and the remainder is applied as wash water to the ice in the top of the container to wash the impurities from the ice rising in the container. Such impurities and the wash water are drained through the drain apertures. In this manner relatively pure ice which does not have impurities on the outside thereof is obtained to be melted into purified water.

A second embodiment of the present invention includes an upright substantially cylindrical container having a refrigerated circular bottom plate onto which impure water to be purified is caused to flow so that portions thereof freeze and the remainder of the impure water remains as a liquid. A scraper removes the ice from the plate. The liquid level in the container extends to a drain outlet for purified water, located nearly at the top of the container. The ice scraped from the bottom plate is lifted through the liquid, past the purified water outlet, and is melted by a heated plate which forms the top of the container. Drainage openings are also provided near the bottom of the container to permit impure water remaining after the freezing of the ice to drain. The rate of ice production, equal to the rate at which ice is melted, exceeds the rate at which purified water is removed from the top drain outlet, and thus there is an excess of purified water which must move downwardly through the rising mass of ice, washing impurities from the surface of the ice particles rising therein; said wash water with the impurities therein leaving by drainage openings at the bottom of the tank. Thus only purified water is removed from the drain at the top of the container.

In a third embodiment of the present invention, an upright cylindrical container is provided having a bottom plate thereon on which a portion of impure feed water is frozen into purified ice and the remainder of said impure water remains in solution with impurities therein. The ice so frozen is scraped from the bottom plate and is lifted within the container. Discharge openings are provided near the bottom of the container to permit the impure water to drain from the container while the ice will continue to rise above the openings. The ice rises until such time as it engages a heating coil within the container which melts a part of the purified ice to provide wash water which drains downwardly through the rising column of ice and then through the discharge openings. In this manner ice is produced and washed. Thereafter the washed ice is removed from the container and melted to provide purified water.

The bottom plate in each of the above described embodiments of the present invention is a roughened plate preferably containing a very shallow spiral groove which has undulations therein to cause the ice formation which is frozen thereon to be held or anchored during the scraping process to thereby prevent the ice from being pushed around as a sheet. Furthermore, the roughness provides a controlled number of nucleation points for freezing of ice so that the ice layer is formed at a rate and physical consistency favorable to efficient scraping of said layer from said bottom plate by removal of the top sections of the ice formation.

The improved water purifying apparatus of the present invention will be more fully understood when the following portions of the specification are read in conjunction with the accompanying drawings wherein:

FIGURE 5 is a detail view of the bearing and rotating seal which may be used in the embodiments of FIGURES 1–4;

FIGURE 7A is a cross sectional view of the general shape of the groove in the bottom plate;

FIGURE 8 is a fragmentary perspective view of a scraper blade which may be used for scraping ice in the top of the container;

FIGURE 9 is a schematic wiring diagram for the electrical circuit which may be utilized in the embodiment of FIGURES 1–4;

FIGURE 10 is a view showing the dimensions of the scraping and lifting blades and the orientation therebetween;

FIGURE 11 is a view of the water smoothing or leveling weir for the embodiment of FIGURE 1 which causes the flow of purified water to be substantially constant irrespective of short-term fluctuations in the supply thereto, said view being taken substantially along line 11—11 of FIGURE 12;

FIGURE 12 is a view taken along line 12—12 of FIGURE 11;

FIGURE 13 is a plan view of the flow smoothing weir taken substantially along line 13—13 of FIGURE 12;

FIGURE 14 is a schematic view of the combined flow smoothing and splitting apparatus for purified water which may be used in conjunction with the apparatus of FIGURE 1;

FIGURE 15 is an enlarged plan view of the flow splitter of FIGURE 14;

FIGURE 16 is a side elevational view of the flow splitter of FIGURE 15;

FIGURE 17 is a view taken along line 17—17 of FIGURE 18 for the purpose of showing dimensions of a flow leveling weir for relatively small flows;

FIGURE 18 is a front elevational view of the outlet wall of the flow leveling weir of FIGURE 17 and having dimensions thereon;

FIGURE 19 is a view of the front wall of a flow smoothing weir suitable for relatively large flows;

FIGURE 20 is a view taken in the direction of line 20—20 of FIGURE 19 for the purpose of showing dimensions; and FIGURE 21 is a view taken along line 21—21 of FIGURE 19 for the purpose of showing dimensions.

Figure 1:
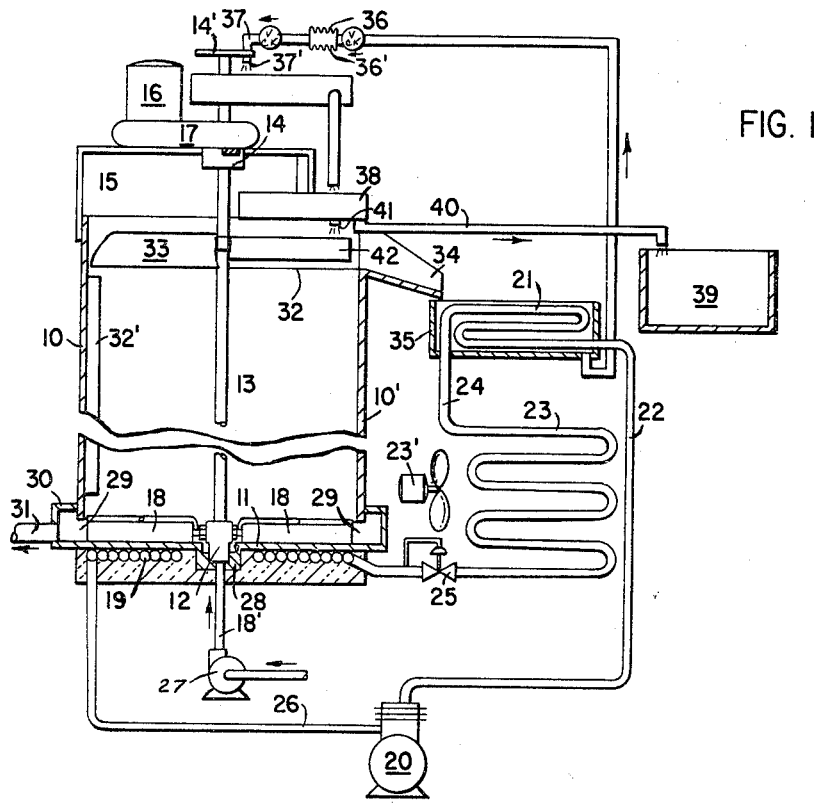
FIGURE 1 is a schematic diagram of a first embodiment of a water purifier made in accordance with the principles of the present invention.

In FIGURE 1, a first embodiment of the present invention is shown. This embodiment includes a substantially cylindrical container 10 having upstanding cylindrical wall portion 10' and a circular bottom plate 11 fabricated of a suitable metal such as cupronickel or brass. The upstanding cylindrical wall portion may be fabricated of plastic. Journalled in bearing 12 located proximate bottom plate 11 is the lower end of rotating shaft 13, the upper end of which is journalled in bearing 14 supported by bracket 15 mounted on cylindrical container 10, said bracket also providing a support for electric motor 16 which is coupled to shaft 13 through gear reducer 17. Scraper blades 18 are mounted at the lower part of shaft 13 in close relationship to bottom plate 11 to scrape ice from bottom plate 11 as shaft 13 rotates.

In order to form ice from a portion of the impure water which is fed into container 10 through conduit 18', freezer plate 11 is suitably cooled by an evaporator 19 forming a part of a refrigeration system which includes compressor 20, ice melting condenser 21 coupled to compressor 20 by conduit 22, air cooled condenser 23 coupled to condenser 21 by conduit 24, expansion valve 25 interposed between condenser 23 and evaporator 19, and conduit 26 which couples evaporator 19 to the intake of compressor 20. Water is fed into container 10 through conduit 18' by pump 27, which is of the constant volume type which will always pump a given amount of liquid regardless of variation in the supply pressure and regardless of variations of the various factors within container 10 which will tend to block the passage of water into container 10 and therefore vary the pump outlet pressure.

In lieu of a constant volume pump, a control arrangement such as shown in copending application Ser. No. 423,053, now issued as U.S. Patent 3,333,436 may be utilized. A rotating seal 28 is provided at the bottom of container 10 as will be described in greater detail hereafter.

The parameters of the system are such that sufficient refrigeration is supplied so that a certain percentage of water fed into container 10 is formed into ice on bottom plate 11, and the rest will remain in liquid form and will contain all the impurities originally present in the impure water. In this respect, it is to be understood that during partial freezing, ice containing no impurities will be formed and all the impurities will form a part of the remaining liquid. Therefore, as scrapers 18 rotate and remove ice from bottom plate 11, a mixture of ice and concentrated impure water will be formed and will be moved upwardly as the ice accumulates, as will be described in greater detail hereafter. The impure water will drain from opening 29 in side wall 10' into manifold 30 surrounding wall 10' and thereafter flow into conduit 31 from which it is dumped. The remainder of ice will continue to rise within chamber 10 and all the while that the ice is building up and rising, the liquid on the ice above openings 29 will continue to drain through manifold 30. At this point it is to be noted that opening 29 extends completely around the periphery of container 10 and contains a screen which is sufficiently large to permit unimpeded draining while preventing movement of ice into manifold 30.

The ice will continue to rise until such time as it reaches upper level 32 whereupon scraper 33 affixed to shaft 13 will cause the ice to move onto chute 34 from which it is dropped into container 35 in which condenser coil 21 is located and the ice within container 35 will be melted into purified water as it absorbs heat from the refrigerant flowing in condenser 21. It will be appreciated that wall 10' of container 10 may extend higher than level 32 for most of the periphery of the container and be broken away only in the vicinity of chute 34 to permit the scraped ice to drop onto chute 34 as scraper 33 rotates.

A key 32' is affixed to the inside of container 10' and has its longitudinal axis parallel to the axis of shaft 13 for the purpose of preventing rotation of the column of ice to thereby permit scraper 33 to shave the ice from the top of the rising column.

The purified water within container 35 is thereafter pumped by intermittently acting pump 36 through conduit 37, leading to flow splitter and leveler 38 which, as described in greater detail hereafter, smooths intermittent flow provided by pump 36 and splits it into two portions, one portion going to storage tank 39 through conduit 40 for subsequent use and the other portion dropping through conduit 41 into flow smoothing weir 42 which deposits the purified water at the top of the ice within container 10 so that this purified water can be utilized to wash any impurities remaining on the surface of the ice, said wash water thereafter draining out through openings 29. Pump 36 provides the above-mentioned intermittent flow because it is of the bellows type having a bellows 36' and check valves on opposite sides of the bellows, as is well known. The left side of pump 36 is attached to conduit 37, end 37' of which is eccentrically mounted on disc 14' mounted on shaft 13. The right side of pump 36' is fixed. Therefore, rotation of shaft 13 will be accompanied by alternate expansion and contraction of the bellows which in turn provides an intermittent pumping action by pump 36'.

It can be seen that the foregoing is a continuous process for forming purified water from impure water. Various other constructional details of the present apparatus which are deemed of importance will be described at a suitable portion of the specification hereafter.

Figure 2:
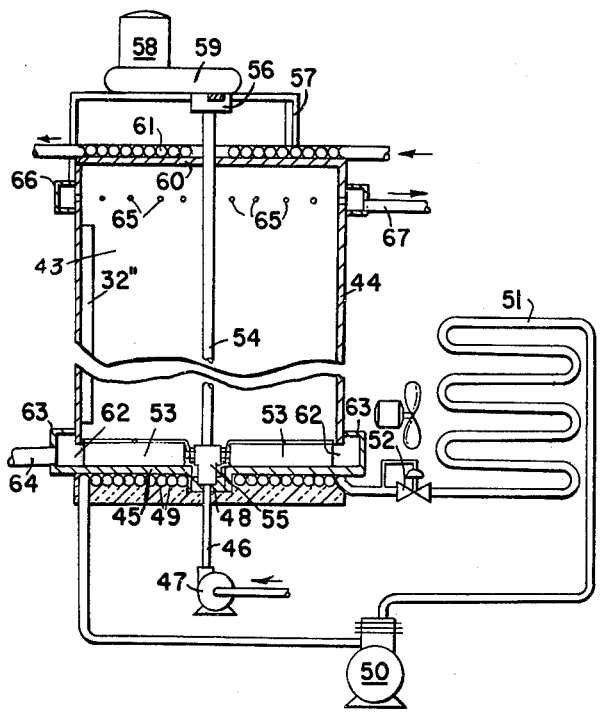
FIGURE 2 is a schematic diagram of a second embodiment of a water purifier made in accordance with the principles of the present invention.

In FIGURE 2 another embodiment of the present invention is disclosed and includes a cylindrical container 43 having an upstanding wall portion 44 and a metallic circular bottom plate 45 of cupronickel, brass or other suitable metals. Impure water, which is to be converted into pure water, is pumped through conduit 46 by constant volume pump 47 and then through rotating seal 48 into container 43. As in the embodiments of FIGURE 1, a portion of this water is frozen into ice on plate 45 because of the proximity of said plate to evaporator coil 49 which forms a part of the refrigeration system including compressor 50, air cooled condenser 51, and expansion valve 52, all coupled to each other by suitable conduits (not numbered) in a manner well known in the art and analogous to that described above with respect to FIGURE 1.

The ice which is formed on bottom plate 45 is removed therefrom by scraper blades 53 mounted on shaft 54 having its lower end journalled in bearing 55 and its upper end journalled in bearing 56 mounted on bracket 57 which also supports motor 58 coupled to gear reducer 59 which actually drives said shaft 54.

As with the embodiment of FIGURE 1, the system of FIGURE 2 has parameters which cause a predetermined portion of the impure water fed onto the surface of the bottom plate 45 to be formed into ice while permitting a second predetermined portion to remain as a liquid containing the impurities after the ice has been formed. As noted above, after the ice has been scraped from bottom plate 45 by scrapers 53, there will be a mixture of ice and water containing impurities in container 43. A first portion of the water containing impurities will drain into manifold 63 surrounding container wall 44 through opening 62 and then pass to a sewer or the like through conduit 64. Another portion of the water containing impurities will pass upwardly with the ice. This portion is allowed to accumulate in this embodiment to saturate the ice in container 43 as high as the level of drain 65. Lifter blades, not shown in FIGURE 2 but described in greater detail hereafter, are provided for moving the scraped ice upwardly in container 43. Such upward movement will be continued until the initial ice which was formed comes into contact with the under surface of upper plate 60. A coil 61 containing warm water or gaseous refrigerant is located in heat transfer relation to plate 60 for the purpose of providing heat for melting the ice in contact with plate 60. The rate at which plate 60 melts the rising ice depends upon the plate surface temperature (which is determined by the plate materials and the coil temperature) and the pressure of the rising ice. If the plate temperature is sufficiently low, the rate of melting of the ice initially impinging on the plate will be less than the rate of its formation by the freezer below. Therefore, there will be an accumulation of ice in the container, said accumulation causing an increase in ice pressure on the melter plate thus increasing the melting rate until an equilibrium is reached so that the rate of melting equals the rate of formation. The increased pressure is provided by the continued lifting action of the lifter blades, which will also cause the ice which was lifted to be compressed into a homogeneous porous cake lying between the lifter blades and said upper plate. Compression of the ice into a substantially homogeneous porous mass allows purified water which is formed as a result of the engagement between the ice and plate 60 to flow downwardly through the rising saturated ice mass in an extremely even manner to effect a thorough washing of the ice particles therein. This action would not be obtained in the absence of such compression of the ice mass inasmuch as the ice mass would otherwise have channels therein and at the container walls which would provide a path of less resistance for the melted purified water than other portions of the mass of ice and therefore such other portions would not be thoroughly washed. It should be noted that only in the type of ice washing column as shown in FIGURE 2 is there the tendency for melted ice to flow down voids in the ice rather than directly through the ice bed. Thus in the embodiments of FIGURES 1 and 3 threre is no need for assuming that the ice bed becomes substantially homogeneous as is done by compressions in the embodiment of FIGURE 2.

It is to be noted that the rate of ice production and the rate of melting are such that the container 43 is always substantially full of packed ice except for a small amount of water which causes the container to be saturated to the level of drain 65. The saturated liquid portion will have a decided purity gradient with increasing purity from the bottom of the container toward the top thereof. In this respect it will be appreciated that the ice in contact with melter plate 60 will be purest because it has been washed the longest and the water produced by melting such ice will drain downwardly to wash the rising ice. This is a continuous process and the end result is that the ice finally reaching plate 60 will have less impurities therein than the ice moving upwardly below it. Since the container 43 is flooded, the water above opening 65 in container wall 44 will tend to drain into said opening and thence into manifold 66 in communication with conduit 67 leading to a storage area or the like for potable water. This water entering manifold 66 is in a relatively pure state because of the above described washing action.

The size of lower opening 62 may be effectively adjusted by the placing of a suitable valve, not shown, in conduit 64, to regulate the overflow of concentrated impure water. This will indirectly control the rate of flow of purified water issuing from openings 65 which must be the difference between the rate of water feed through conduit 46 and that issuing from conduit 64, which rate of flow must be less than the rate of melting by plate 60 to prevent impure water from rising within container 43. The excess melt passes downwardly through the rising ice mass and performs the above described washing function and is discharged through drain opening 62. It will be appreciated, however, that drainage through opening 62 must be sufficiently slow to maintain container 43 in the above described saturated condition so that the purified water may flow into opening 65. In this respect, with a given input from conduit 46, if drainage from lower opening 62 is too great, there will be no purified water leaving opening 65 because the container will not be maintained in a saturated condition. On the other hand, if the drainage through opening 62 is not at a sufficiently high rate, the impure water will tend to rise within container 43 and then will be discharged through opening 65.

The various constructional details of the various components which are of importance in the embodiment of FIGURE 2 will be more fully described hereafter.

Figure 3:
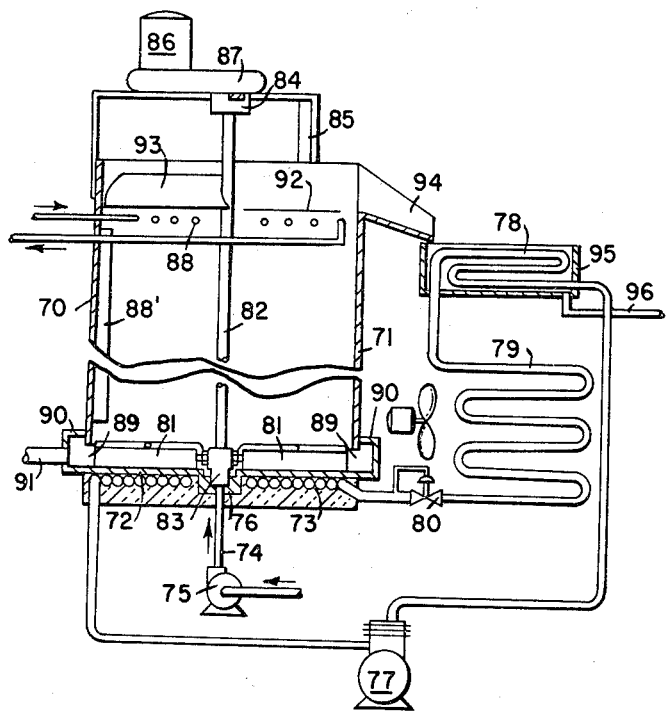
FIGURE 3 is a schematic diagram of a third embodiment of a water purifier made in accordance with the principles of the present invention.

In FIGURE 3 another embodiment of the present invention is disclosed which includes container 70 which may be cylindrical and has upstanding wall 71 and a circular bottom plate 72 located therein in heat transfer relation to evaporator coil 73 which cools said plate. Water to be purified is fed through conduit 74 by constant volume pump 75 through rotating seal 76 and into the container 70 where it frozen on plate 72. The freezing is effected by a refrigeration system which includes compressor 77, ice melting condenser 78, air cooled condenser 79, expansion valve 80 and evaporator 73 all coupled in series in the manner conventional in the art, and as more fully described with respect to FIGURE 1.

The ice which is formed on bottom plate 72 is removed therefrom by blades 81 which are fixedly secured to shaft 82 having its lower end journalled in bearing 83 and its upper end journalled in bearing 84 supported on bracket 85 which also supports motor 86 coupled to gear reducer 87 which actually drives said shaft 82. The ice which is formed within container 70 is caused to rise therein, engaging coil 88 through which may circulate warm water or other warm liquid and which is located within container 70. It will be noted that coil 88 has space between its tubes to allow product ice to rise upward for scraping.

As with embodiments of FIGURES 1 and 2, a mixture of predetermined proportions of ice and water are formed within container 70 because of the parameters of the water feed and refrigeration system, and a portion of the concentrated impure liquid remaining after the freezing of the ice will drain through openings 89 into manifold 90 and thence into conduit 91 leading to a suitable sewer. The ice with just the surface impurities thereon will continue to rise within container 70 and as it rises the impurities will drain therefrom. However, when the ice with a minimum amount of surface impurities reaches heating coil 88, a portion of said ice will be melted to provide wash water which flows downwardly through the rising column of ice to further wash impurities from the surface of the ice particles. The cleaned ice thereafter rises between the tubes of coil 88 to level 92, and upper scraper 93, which rotates with shaft 82, scrapes the upper layer of ice and causes it to move onto chute 94 which leads to container 95 in which condensing coil 78 is located, said condensing coil 78 serving the function of melting the cleaned ice into purified water which leaves container 95 through conduit 96 and is conveyed thereby to a suitable storage tank, not shown.

As in the embodiment of FIGURE 1, the upper portion of wall 71 of container 70 may extend above the level 92 for the portion of its periphery which is not in the vicinity of adjacent slide 94 so that ice will only leave container 70 by way of slide 94 as a result of the scraping action of scraper 93.

It will be noted at this time that the ice rising in a column in container 70 will have a tendency to rotate with scrapers 81. However, coils 88, once they engage the column of ice, will prevent such rotation and thus hold the column steady so that scraper 93 may remove the upper portion therefrom. A key 88' may extend inwardly from wall 71 to prevent rotation of the ice rising in container 70 prior to the top of the ice mass reaching coil 88. Once it reaches coil 88, the key is not necessary. The reasons that rotation of the ice mass must be prevented are twofold: Firstly, the prevention of rotation will permit proper operation of scraper 93. Secondly, lifting blades (to be described hereafter) which move the ice upwardly, cannot operate properly unless rotation of the ice mass is prevented.

Figure 4:
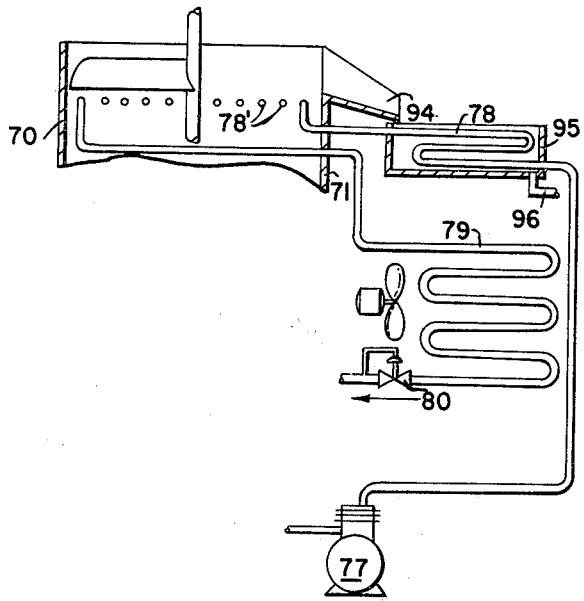
FIGURE 4 is a fragmentary view of a portion of a schematic diagram of an alternate refrigeration circuit which may be substituted for the refrigeration circuit for the water purifier shown in FIGURE 3.

A modification of the embodiment of FIGURE 3 is shown in FIGURE 4, wherein numerals like those in FIGURE 3 depict like elements of structure and will therefore not again be described in the interest of brevity. The only difference between the embodiment of FIGURE 3 and FIGURE 4 is that in the latter an additional condenser coil 78' is located within container 70 instead of the warm water coil 88 of FIGURE 3. The hot gases passing through condenser coil 78' will serve the function of melting the ice into purified water which is utilized for wash purposes. It will be appreciated that such a condenser coil could also be utilized in the embodiment shown in FIGURE 2 instead of the warm water coil 61 shown. For certain applications, particularly in supplying wash during startup, coil 88 may be functionally replaced or supplemented by circulating air impinging on the ice surface to provide partial melting of said surface. However, in most cases uncirculated air within the container will be warm enough to melt sufficient ice so that impure ice will never reach the level of coil 88.

Figure 6:
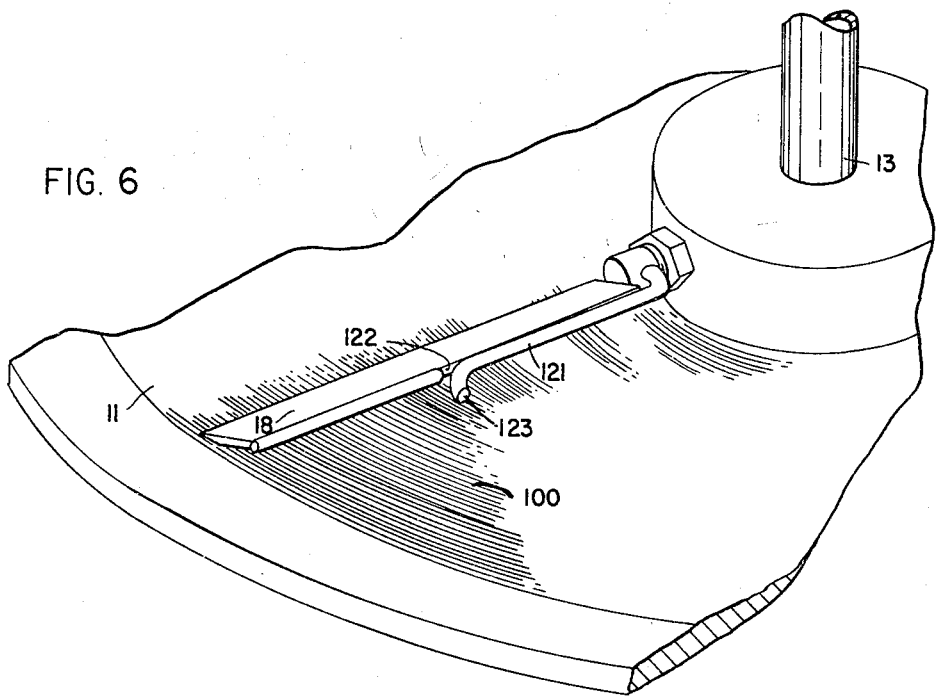
FIGURE 6 is a fragmentary perspective view of the bottom plate on which freezing occurs and the scraper associated therewith which may be used with the embodiment of FIGURES 1–4.
Figure 7:
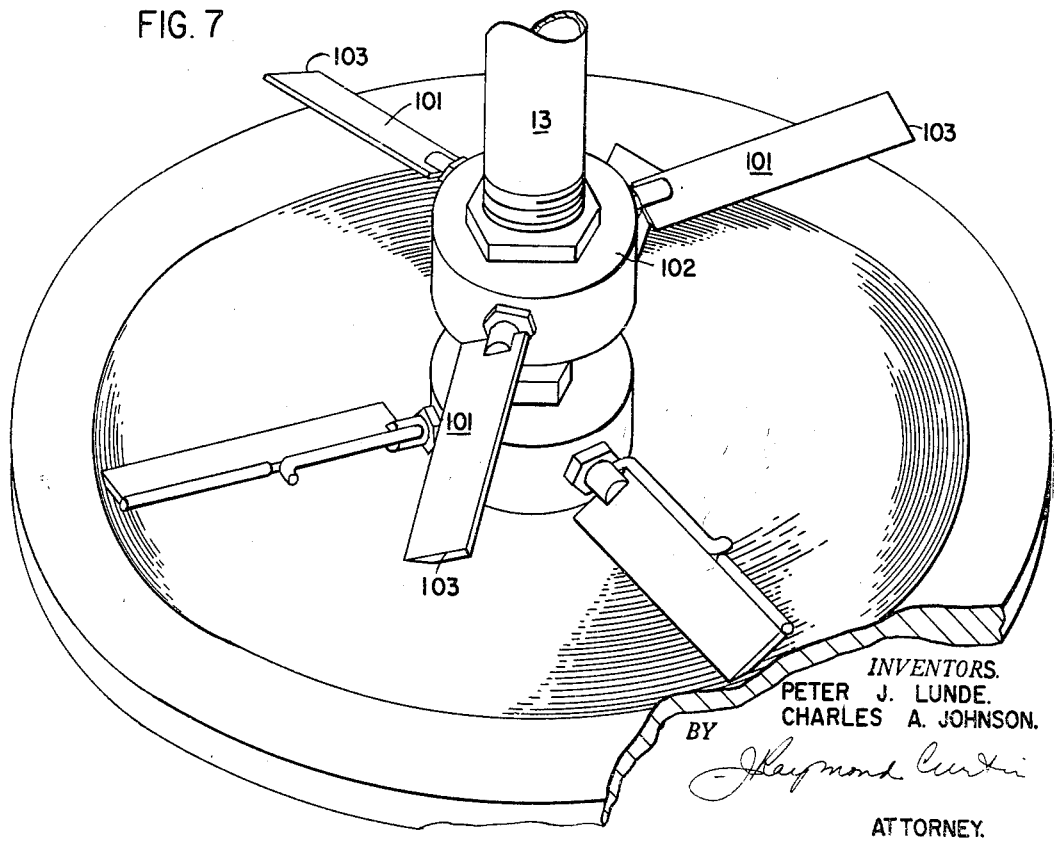
FIGURE 7 is a fragmentary perspective view of the bottom plate and the scraping blades and the lifting blades which may be used in the embodiments of FIGURES 1, 2 and 3.

Various components of the embodiments of FIGURES 1–4 are identical and will be described hereafter. More specifically, bottom plates 11, 45, and 72 of FIGURES 1, 2, and 3, respectively, are identical and encompass the following structure as shown in FIGURES 6, 7, and 7A. Plate 11 must have a rough surface which will permit proper freezing thereon and also permit the ice to be shaved therefrom in a satisfactory manner. More specifically, the surface of the plate 11 (and 45 and 72) must have a surface which is rough enough to allow the ice which is formed thereon to hold fast during scraping to thereby prevent the ice from rotating as a sheet with the rotation of the scraper blades. Furthermore, the surface 100 must provide a large number of nucleation sites for formation of ice on said surface. However, the nucleation sites must not be so numerous as to form an unscrapable amorphous layer. The surface 100 of plate 11, of FIGURE 6, which has been found extremely satisfactory in use, is one which was generated as a spiral by a lathe cutting tool, or the like, and which had the following dimensions. The grooves which were formed were triangular in cross section about $3/1000$ of an inch deep (dimension 46', FIGURE 7A), $12/1000$ of an inch wide (dimension 47', FIGURE 7A), and on a $13/100$ of an inch pitch (dimension 48', FIGURE 7A). Furthermore, the grooves were rough cut as a result of the lathe cutting tool being caused to chatter during the cutting so as to cause the grooves which were generated in spiral form to have uneven and undulating sides for effecting the above enumerated objectives with respect to the ice to be formed thereon. As noted above, while only plate 11 has been described, plates 45 and 72 are identical thereto.

In FIGURE 10 various details of construction of the scraper blades shown in FIGURES 1, 2 and 3 are presented. At this point it is to be noted that blades 18 of FIGURE 1, blades 53 of FIGURE 2 and blades 81 of FIGURE 3 are identical. Therefore, blades 18 will be the only ones referred to in FIGURE 10. Each of blades 18 are about 3 inches long and made from ⅛ inch No. 316 stainless steel sheet milled to a sharp edge and relieved at an angle of 15° under the leading edge as can be seen from FIGURE 10. The upper edge of the blades were inclined at an angle approximately 26° to the surface of the freezing plate. While three blades are shown as being used in FIGURE 7, other numbers of blades can be used. The relationship between each of the three scraper blades can be appreciated from FIGURE 10, and the relationship between lifting blades 101 to be described hereafter, and between blades 101 and 18 will also be appreciated from FIGURE 10.

In addition, in the embodiments of FIGURES 1, 2, and 3, lifting blade 101 (FIGURE 7) may be utilized having the dimensions shown in FIGURE 10. These blades are relieved at their under side at an angle of 6° and are inclined at an angle of 21° from the horizontal and have their lower edges located approximately an inch above the freezing surface, as can be seen from FIGURE 10. Furthermore, the inner ends of the blades are mounted on hub 102 which is keyed for rotation with the central shaft such as 13 of FIGURE 1. The lifting blades 101 serve the function of lifting the ice and preventing its entire weight from bearing down on the scraping blades which remove the ice from the bottom plate.

In addition to lifting blades 101 shown in FIGURE 7, suitable keys 32', 32" and 88' are provided extending inwardly from the inside wall of the containers 10 and 70, respectively, to prevent rotation of the ice, the existence of the keys causing the lifting blades to produce a proper lifting effect by holding the ice mass stationary and thus permitting the lifting blades to rotate relative thereto.

A suitable configuration for the top scraper 33 (FIGURE 1), which may be identical to scraper 93 of FIGURE 3, is shown in FIGURE 8. This scraper includes an inner end 106 for attachment to the centrally located rotating shaft and includes a rear blade portion 107 having a lower edge 108 for actually scraping the ice and an upper leading edge 109 leading into the direction in which blade 105 rotates. An undulating sheet-like member 110 is affixed to blade 105 at points 111, and by virtue of the undulating characteristic of edge 110, a series of curlicues of scraped ice are formed which move ahead of blade 105 until they are discharged by moving laterally onto chutes such as 34 and 94 of FIGURES 1 and 3, respectively. This scraper blade is oriented when mounted so that the trailing edges of undulating member 110 are slightly higher, relative to the ice, than the leading edges.

In FIGURE 5 the rotating seal and water distribution construction is shown which is utilized to conduct impure water into the various containers shown in FIGURES 1-3. More specifically, this will be described with respect to the embodiment of FIGURE 1 and it will be understood that identical constructions are utilized in FIGURES 2 and 3. Conduit 18' has its lower end leading into combined sealing and bearing plate 28, the inner surfaces 12 of which act as a combined bearing and seal. The lower end of shaft 13 rotates within surface 12. Shaft 13 has a hollow portion 114 therein for receiving impure water from conduit 18' and conducting this water through radial port 115 to annular manifold 116 which is in communication with radial ports 117 in bushing 118 which has a plurality of threaded nipples 119 at its outer ends for mounting blades 18. The inner ends of threaded nipples 119 are threaded into bushing 118 and are locked in position by nuts 118'. Threaded nipples 119 have an internal conduit 120 therein in communication with radial conduit 117 for conducting impure water into tubes 121 (FIGURE 6) extending along trailing edges 122 of blades 18 and having a rearwardly extending portion 123 for discharging impure water immediately behind each of blades 18, thus keeping said impure water from impinging on metal surfaces other than the freezing plates in order to prevent the formation of undesired ice deposits.

In FIGURE 9 a simplified wiring diagram for the system shown in FIGURES 1, 2 and 3 is shown wherein compressor 20 is coupled in series with condenser fan motor 23' and float switch 125 across voltage source V, float switch 125 being controlled by float 126 which is in the storage tank for purified water. It will be appreciated that whenever one of the storage tanks associated with each of the embodiments of FIGURES 1-3 (but not shown in FIGURES 2 and 3) is full, switch 125 will open to terminate the flow of current to compressor 20 and fan motor 23'. Furthermore, a solenoid actuated valve may be placed in series in the circuit to shut off the flow through the conduit such as 18' which feeds impure water into the containers whenever the refrigeration system is shut down.

A flow leveler and splitter 38 which may be utilized in the apparatus of FIGURE 1 is shown in FIGURE 14. At this point it may be said that this flow leveler and splitter may be identical in all respects to the flow leveler and splitter described in detail in copending application Ser. No. 510,121, filed Oct. 18, 1965, now issued as U.S. Patent 3,393,696, as a division of application Ser. No. 423,053, filed Jan. 4, 1965, now issued as U.S. Patent 3,333,436. The outlet end 37' of conduit 37 overlies flow leveling weir 182 which is affixed to the frame of the machine. A suitable collecting gutter or the like, not shown, is affixed to flow leveling weir 182 for receiving water from the outlet of conduit 37 and routing it to weir 182. This gutter may be in the form of an annular ring (not shown). However, it will be appreciated that the discharge from conduit 37 will be only during 180° of rotation of disc 14' (FIGURE 1) because of the fact that the pumping mechanism inherently provides a discharge stroke during one half of the rotation of the disc 14' and an intake stroke on the other half. The intermittently supplied purified water to weir 182 is caused to be discharged from the weir in a constant stream as will become more apparent hereafter in conjunction with the description of FIGURES 11, 12 and 13. However, at this point it is to be accepted that the stream 183 is a smooth and steady one.

Flow splitting of stream 183 is effected by a disc 184 having a plurality of projecting vanes 185 with spaces 186 therebetween, disc 184 being mounted for rotation with shaft 13. It will be appreciated that the entire periphery including vanes 185 and spaces 186 must add up to 360° and therefore by proportioning the ratio of spaces 186 to vanes 185, the water of stream 183 may be divided in given proportions as will become apparent. More specifically, during rotation of disc 184, whenever a vane 185 underlies stream 183 the water will be deflected by said vane into receptacle 187 from whence it passes through conduit 40 (FIGURE 1) to storage tank 39 (FIGURE 1). However, when a blank space 186 is directly below stream 183, said stream will enter receptacle 188 mounted on the frame of the machine. Thereafter the intermittent flow from receptacle 188 passes through conduit 189 to flow smoothing weir 190, which is also mounted on the frame of the machine. Weir 190 may be of the construction shown in FIGURES 11, 12 and 13. The flow emanates from weir 190 in a steady stream 191 and impinges on various portions of flow splitter 196 (FIGURES 14, 15 and 16) which will be described in greater detail hereafter, flow splitter 196 being keyed to shaft 13 for rotation therewith.

Flow splitter 196 consists of a plate of sheet metal or plastic which is bent in the manner shown in FIGURES 15 and 16 and has a central aperture 197 which fits around shaft 13. Splitter 196 includes four peaks 198, 199, 200 and 201 and the space between each pair of adjacent peaks encompasses 90° of the periphery. Intermediate pairs of adjacent peaks are lower creases, with lower crease 202 lying between peaks 200 and 201, lower crease 203 lying between peaks 198 and 201, lower crease 204 lying between peaks 198 and 199, and lower crease 205 lying between peaks 200 and 199. Since each of the peaks are approximately 90° apart, it can readily be appreciated that the portion on the splitter between each pair of peaks will underlie stream 191 for approximately 90° of the travel of the entire splitter 196. However, as can be seen from FIGURE 15, each of the lowermost creases 202, 203, 204 and 205 terminate in a position which is directly above a different weir of the four weirs 206, 207, 208 and 209 which form the wash water distributor 210. For example, as can be seen from FIGURE 14, while stream 191 drops between peaks 198 and 199, the flow will be in the direction of arrow 211 into weir 206 and thereafter because of the smoothing action which is the same as will be described below with respect to FIGURES 11-13 an even flow 212 will pass from weir 206 into the ice in container 10. Furthermore, the flow which hits between peaks 200 and 199 will flow in the direction of arrow 213 into weir 207 and a steady stream 214 will thus pass from weir 207 because of its flow smoothing action. Analogous action occurs with respect to weirs 208 and 209.

It can readily be seen that the exit streams of each of weirs 206, 207, 208 and 209 is a different distance from the center of shaft 13 and therefore as shaft 13 rotates, four concentric circles of fresh purified water leaving weirs 206–209 will be applied to the ice in the top of container 10. Thus, regardless of the intermittent supply provided by pump conduit 37 leading from bellows pump 36 (FIGURE 1) smooth flow of purified water will be applied to the surface of the ice emerging from container 10.

It will be appreciated that a plurality of weirs, such as 206–209, shown in FIGURE 9, are utilized only when the diameter of container 10 is relatively large. If it is relatively small, a lesser number of weirs may be utilized because the wash water impinges on the top of the ice in a circular line and it will spread into the shape of a cone in moving downwardly through the ice because of the nature of the fusion in the ice formation.

The foregoing action of the water purifying apparatus 10 will continue until such time as storage tank 39 is full whereupon a float valve 126 (FIGURE 9) will be actuated to terminate the operation of all components of the electrical circuit and shut the machine off. Whenever the level in storage tank 39 (FIGURE 1) falls below a predetermined value, the apparatus will again automatically start up to provide purified water.

Flow smoother or leveler 182, FIGURE 14, may have the construction shown in FIGURES 11, 12 and 13. More specifically, flow smoother or leveler 182 is essentially a box-like tank having a bottom 215, an end wall 216, a pair of side walls 217 and a front or outlet wall 218. Front wall 218 is split into two sections 219 and 220 divided by slot 221 having weir barrier 222 therein. The entrance section 223 to weir barrier 222 must provide a sufficiently large distance between inner face 223' of wall 218 and inner face 222" of weir barrier 222 to prevent changes in surface effects of the water entering slot 221 from affecting the liquid overflowing weir barrier 222. Surface effects as used herein manifest themselves in the differences in height of wetted surface on inner face 223'. Slot 221 can be of any width which will permit the water to climb therein by capillary action. The exit guide 224 keeps changes in the surface effects from affecting the liquid overflowing weir barrier 222 and provides a transition to downward flow from the horizontal flow over the weir barrier, and there must be a large enough distance between outer face 222" of weir barrier 222 and outer face 224' of wall 218 to discourage horizontal flow from the weir. The lower end 225 of front wall 218 has angled sides 226 to insure stream formation at and only at the desired point of exit 225'. If the volume of the chamber behind the weir is made sufficiently large, it will smooth an intermittent flow so that the outflow is nearly constant, since the instant weir produces only small changes of flow with respect to chamber level. In practice it has been found that slot widths of slot 221 of 1/32 of an inch to 1/8 of an inch were appropriate for flows of between 10 and 200 ml./min., most useful in this invention. However, the longer that weir barrier 222 is in plan, that is, the greater the dimension between the inner face 222' and outer face 222", the more resistance to flow the weir will have. In the foregoing construction, the height of face 218 is on the order of 1 to 2 inches.

The weir in FIGURES 11, 12 and 13 minimizes the effects of significant variance of surface effects, particularly variances in wetting, which could affect flow through more conventional weirs. In other words, the weir construction tends to cause the surface effects which affect flow to effectively remain constant or be removed physically from critical areas. The reason that it is necessary to take surface effects into consideration in equipment of the instant type is because of the low flows involved. In this respect the apparatus has a capacity of between 20 and 40 gallons of purified water a day which would mean that it produces approximately twice this much melted ice, assuming that the produced water is split evenly into wash water and potable product. It will be readily appreciated that if the flows from the weir varied, not only might there be spotty wash water application from weirs 206, 207, 208 and 209, but also the division of stream 183 would not be as accurate as required because its flow would not be even.

As can be seen from FIGURE 11, if the water level 217' in flow smoother or leveler 182 is below the level of the top 222' of the previously wetted weir barrier 222 the water will climb over the top of weir barrier 222 because of its capillary attraction with the sides of slot 221. As the level 217' rises, the water level in slot 221 will rise correspondingly, and the flow will be determined by the difference in elevation between levels 217' and 225' and the impedance to flow through slot 221. Above a certain minimum flow, a stream rather than droplets will issue from the weir at 225', and still greater flows will then be linearly proportional to liquid level 217' until the level becomes so great that static force exceeds surface force in slot 221 and flow is no longer confined to channel 224.

If the sides of slot 221 are made of a material which wets reproducibly, such as oxidized copper, brass, or the like, the flow characteristics from the weir are reproducible over a wide range of flows. In other words, once the sides of slot 221 are wetted the pattern of wetting will remain fairly constant regardless of the level of liquid in the weir and thus the flow out of the weir will remain substantially constant for a given liquid level 217'. The characteristic of the weir construction of FIGURES 11, 12 and 13 is that it will wet the surface of the sides of slot 221 in nearly the same manner regardless of the previous history of flow through the weir and regardless of the cleanliness of the surface of the sides of slot 221. Once the flow through slot 221 has been started by raising the liquid level sufficiently, the wetting of the sides of slot 221 will be the same for any given flow, and thus a given level will correspond with a given flow which is a requirement for good smoothing of varying flows.

In FIGURES 17 and 18 the dimensions for the outlet wall 218 of a flow leveling weir such as shown in FIGURES 11, 12 and 13 are given. These dimensions are considered satisfactory for relatively small flows.

In FIGURES 19, 20 and 21 the dimensions for an outlet wall 218 of a flow leveling weir such as shown in FIGURES 11, 12 and 13 is shown when the weir is de-energized for relatively large flows.

It can thus be seen that the various embodiments of the present invention are manifestly capable of achieving the above enumerated objects and while preferred embodiments have been disclosed, it will be appreciated that the present invention may be otherwise embodied within the scope of the following claims.

We claim:

1. Water purifying apparatus comprising a container having an upwardly extending cylindrical wall surface and a substantially horizontal flat bottom surface, means for feeding impure water into said container, cooling means for cooling said bottom surface to thereby freeze a portion of said impure water into ice on said bottom surface, a vertical shaft, means adjacent the bottom surface and supported on said vertical shaft for scraping said ice from said bottom surface, separate means extending radially from said shaft overlying the scraper in spaced relation thereto for lifting said ice upwardly in said container, said means being angularly disposed relative to the surface, drainage means located above said bottom surface for permitting impure water remaining after the freezing of said ice to be drained from said container, means for applying purified water to the ice at the top of said container to wash impurities therefrom which in solution with said purified water drain from said chamber through said drainage means.

2. A water purifying apparatus as set forth in claim 1 wherein said means for applying purified water to the ice at the top of said container comprises heating means at the top of said container for melting washed ice as it comes into contact therewith.

3. Water purifying apparatus as set forth in claim 2 wherein said heating means comprises a hot gas coil of a refrigerating system.

4. Water purifying apparatus as set forth in claim 1 including means for converting in place said ice at the top of said container into purified water.

5. Water purifying apparatus as set forth in claim 4 wherein said means for converting said ice into purified water comprises heating means at the top of said container for melting said washed ice, second drainage means in said container located proximate said heating means for removing purified water from said container, and wherein said cooling means in conjunction with said heating means produce purified water, some of which will be discharged with the impure water at the first drainage means located at the bottom of the column, so as to wash impurities from between the ice particles as it travels downwardly in said container, provided the rate of impure water withdrawal from the lower drainage means is in excess of the rate at which impure water remains behind when ice is formed, with the remainder of the purified water accumulating until it reaches the second drainage means at the top of the column, and will discharge therefrom.

6. Water purifying apparatus comprising a container having a bottom plate, means for feeding impure water into said container, cooling means located in heat transfer relation to said bottom plate for freezing a portion of said impure water into ice, scraper means for removing ice from said bottom plate, drainage means located above said bottom plate for permitting said impure water remaining after the freezing of said ice to be drained from said container, means for washing impurities from the outside of said ice, said bottom plate including a roughened surface capable of providing a controlled number of nucleation points for the freezing of ice to thereby freeze said ice thereon and for providing a sufficiently rough surface to prevent the ice formed on said bottom plate from rotating as a sheet when subjected to the action of said scraper means.

7. Water purifying apparatus as set forth in claim 6 wherein said roughened surface of said bottom plate comprises a spiral groove or grooves in alternate pattern.

8. Water purifying apparatus comprising a hollow container having an upwardly extending wall surface and a bottom surface, a shaft having a substantially vertical axis for rotation within said container, a plurality of circumferentially spaced scraper blades extending from said shaft, conduit means mounted on each of said blades for depositing water on said bottom surface rearwardly of the respective blade on which each of said conduits is mounted, cooling means for cooling said bottom surface to thereby freeze a portion of said impure water discharged from each of said conduits into ice, said discharging of said water to be such that the discharged stream does not impinge on cold surfaces other than the freezer plate and drainage means for permitting impure water remaining after the freezing of said ice to be drained from said container.

9. Water purifying apparatus as set forth in claim 8 including a plurality of lifting blades extending from said shaft above said scraping blades for lifting ice scraped from said bottom surface to thereby prevent the weight of said ice in said container from interfering with the scraping action of said scraping blades.

10. Water purifying apparatus as set forth in claim 9 including means in said container for preventing the rotation of the ice in said container to thereby improve the lifting action of said lifting blades by permitting relative rotation between said lifting blades and said ice.

11. Water purifying apparatus as set forth in claim 9 wherein said bottom surface includes a roughened surface capable of providing a controlled number of nucleation points to thereby freeze ice thereon and for providing a sufficiently rough surface to prevent the ice formed on said bottom surface from rotating as a sheet when subjected to the action of said scraping blades.

References Cited

UNITED STATES PATENTS

| | | | |
|---|---|---|---|
| 1,930,570 | 10/1933 | Taylor | 62—354 |
| 2,059,065 | 10/1936 | Tuscan | 62—354 |
| 2,503,395 | 4/1950 | Le Boeuf | 62—354 |
| 3,319,436 | 5/1967 | Wilch | 62—354 |
| 2,082,752 | 6/1937 | Lewis et al. | 62—354 |
| 2,788,643 | 4/1957 | Martin | 62—354 |
| 3,012,409 | 12/1961 | Ashley | 62—58 |
| 3,070,969 | 1/1963 | Ashley | 62—124 |
| 3,222,880 | 12/1965 | Findlay | 62—123 |

FOREIGN PATENTS 907,644   10/1962   Great Britain.

NORMAN YUDKOFF, Primary Examiner

U.S. Cl. X.R.

62—68, 354